June 13, 1944. E. O. WHEATON 2,351,568
ELECTROFORMING METHOD OF PRODUCING DISPENSING TOOLS
Filed Aug. 29, 1941 2 Sheets-Sheet 1
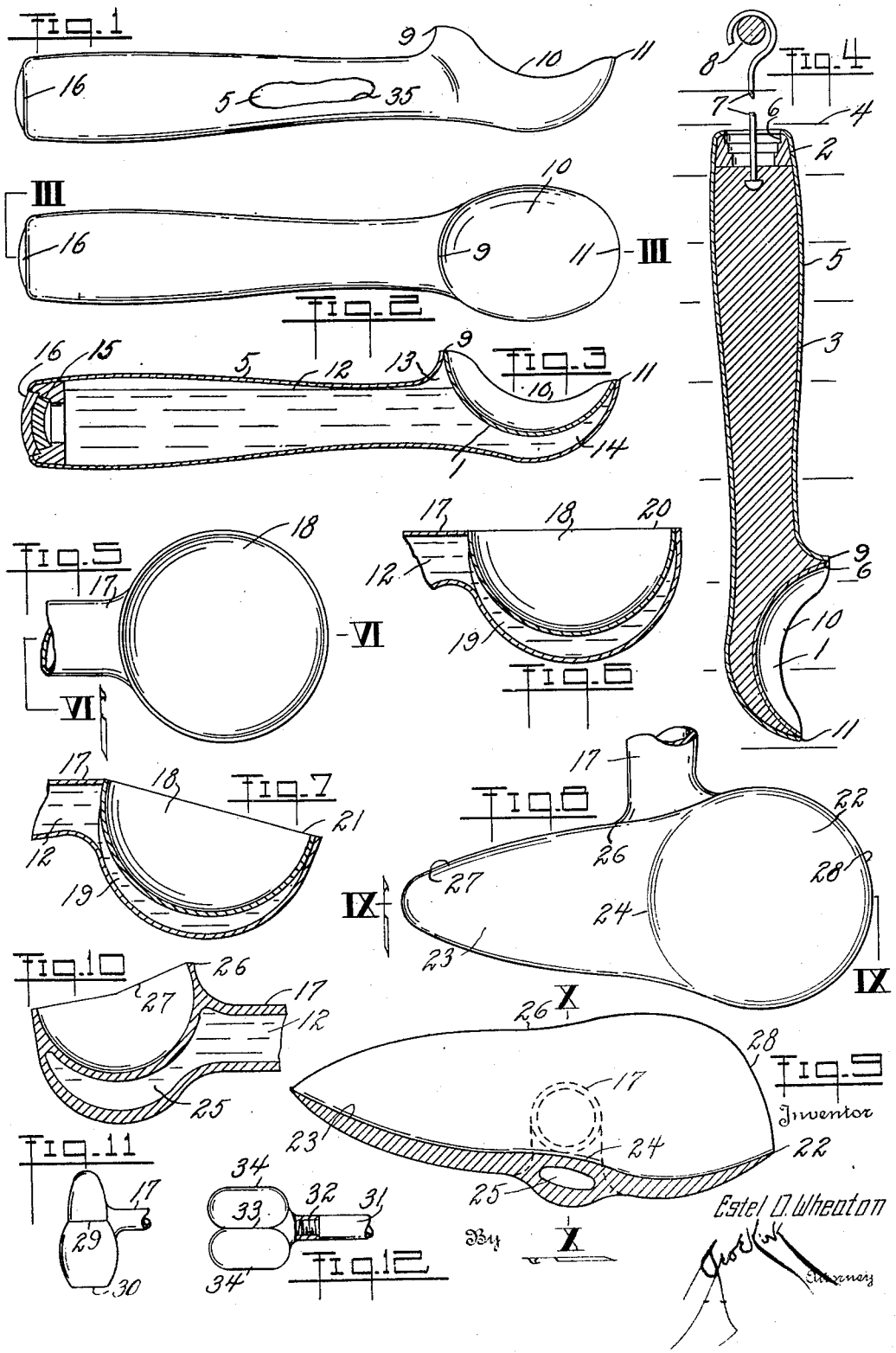

June 13, 1944. E. O. WHEATON 2,351,568
ELECTROFORMING METHOD OF PRODUCING DISPENSING TOOLS
Filed Aug. 29, 1941 2 Sheets-Sheet 2
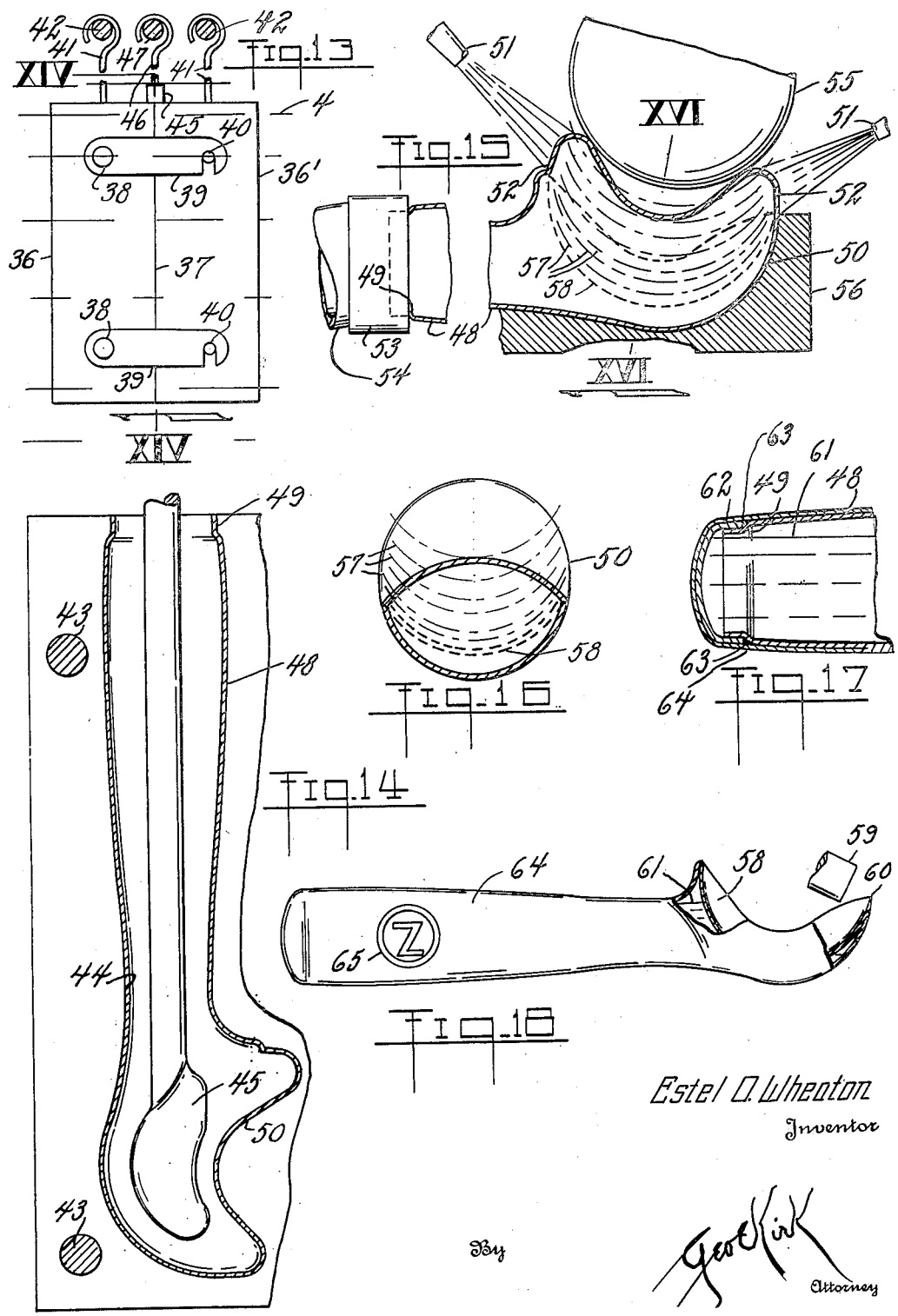
Estel O. Wheaton
Inventor Patented June 13, 1944

2,351,568

UNITED STATES PATENT OFFICE 2,351,568

ELECTROFORMING METHOD OF PRODUCING DISPENSING TOOLS

Estel O. Wheaton, Toledo, Ohio, assignor to Kelly-Wheaton Company, Toledo, Ohio, a corporation of Ohio Application August 29, 1941, Serial No. 408,892

3 Claims. (Cl. 204—9)

This invention relates to tools adapted for dispensing bulk material, especially for service portions of ice cream.

This invention has utility when incorporated in tools adapted for gathering or severing portions of bulk material, said tools being of the bowl type with a direct handle grip extension therefrom of such proximity to the bowl that temperature response from the grasp of the bare hand of the operator may affect the bowl to minimize tendency of the gather to adhere thereto. A factor in this utility arises in the heat conductivity of the electrodeposit in the tool.

Referring to the drawings:

Fig. 1 is a side elevation of an embodiment of the invention in a tool for congealed material, such as ices or ice cream;

Fig. 2 is a plan view of the device of Fig. 1 looking into the bowl;

Fig. 3 is a section on the line III—III, Fig. 2, showing the bowl and section of its tubular handle;

Fig. 4 is a vertical section of the tool of Fig. 1 in the suspended position for electrodeposit in the manufacture as a bond between the ferrule at the handle tip and the bowl;

Fig. 5 is a plan view of a spheric type of bowl, parts of the handle being broken away;

Fig. 6 is a section on the line VI—VI, Fig. 5, showing the bowl and its jacket;

Fig. 7 is a view similar to Fig. 6 in which the bowl is tilted relatively to the direction of the handle;

Fig. 8 is a view of the bowl having a ridge or intermediate portion tending to develop special form of gatherer;

Fig. 9 is a section on the line IX—IX, Fig. 8, showing the medial ridge location;

Fig. 10 is a view on the line X—X, Fig. 9, showing the duct or jacket connection from the medial ridge into the handle;

Fig. 11 is a view of the bowl in which there is an abrupt terminus one way and a round terminus the other way in the special form for the gatherer;

Fig. 12 is a twin gatherer form as side by side, instead of in sequence, as in Figs. 8 and 11;

Fig. 13 is a vertical side elevation of the two-part mold or die-block in suspended position as submerged in an electrolyte, with the mold as one electrode, and the complementary electrode appropriately located in the mold, for electrodeposit to be effected on the mold in the manufacture of a dispensing tool hereunder, somewhat in converse to that carried out in Fig. 4;

Fig. 14 is a section on the line XIV—XIV, Fig. 13, disclosing the electro-deposit tool as formed between the mold electrode and the permanent interior electrode, for the deposit to be effected from the electrolyte;

Fig. 15 is a detail view, with parts broken away, showing the collapsing of the bulbous terminus from the handle toward bowl form;

Fig. 16 is a section on the line XVI—XVI, Fig. 15, showing in dotted lines the progress of the bulb-collapsing head toward the bowl inner wall form;

Fig. 17 is a fragmentary view, in section, of the closure assembly for sealing the partially-filled chamber of the bowl and handle with a heat-transferring liquid; and Fig. 18 is a side elevation, with parts broken away, of the completed service gathering tool of electro-deposit, wherein the deposit is from the tool outside inward, thereby determining initially the exterior finish for the article as that of the mold electrode, even to special characters which may be adopted thereon.

Formation outwardly

In a method of production hereunder, there may be the selection of a bowl portion 1 of sheet metal. This bowl portion is preferably of burnished or polished sheet metal to provide a prefinished terminal portion in electrodeposit operation for manufacture. Remote from this portion 1, there may be a screw machine product or ferrule 2, adapted to coact hereunder as an additional terminal portion. These terminal sections or portions 1, 2, may be connected by an intermediate outline-providing contour (Fig. 4). As a mold or pattern forming section 3, there may be a base for a core. It is desirable hereunder to have this core of a melting point above that of an electrolyte 4 as to its temperature in operation. This core should be of sufficient rigidity and at least of a superficial electrical conductivity to respond to an electro-plating 5.

The interior of the face of the bowl 1 and of the ferrule 2 are, in practice, coated with a resist 6 against an accumulation of electrodeposit thereon. Accordingly, with the electric current from a suitable anode flowing through the electrolyte 4, there is developed and deposited a film or plating 5. This may be of rather pure iron or a metal to resist reaction from use, with milk products from fruit acids.

The electric current rate may be for such interval in the suspension of the core in the electrolytic bath as may be appropriate to develop a film or plating of suitable strength and thickness for service operation. The body of this electroform is thus ample to be self-sustaining. This suspension of the core may be by hook 7 from bar 8. Upon completion of this bath or plating operation, the article as coated or plated upon the core 3 may be removed from the bath and exposed to a temperature less than that to disturb the ferrule 2 and the bowl lining 1, as well as less than to disturb the plating 5. When the core 3 has as an element or ingredient thereof a wax or low melting point metal or alloy, the appropriate temperature is adopted for a fusing or melting out of such core 3. There is then left the hollow article in a tubular form, freed or clear of the mold or pattern.

It is then only necessary to burnish the exposed portions of the plating 5. Such smooth finishing may be previously accomplished as to the bowl lining or inner face or wall 1. The endless bounding rim 9 may then be ground or finished. The rim 9 has herein an inward bow or dip portion 10 in the rim extent toward its forward severing edge 11 remote from the handle.

Upon completion of the hollow article form for the tool, there may be introduced thereinto a liquid 12 partially to fill a chamber 13. Thereafter, a sealing closure 15 may be applied at the portion of the grip or handle remote from the bowl. The double wall for the bowl provides chamber portion 14 in communication with the tubular handle. Outer or finish closure 16 serves as a trim and may carry identification data or marking for the tool as to its size, etc.

The tool

The tool, as completely assembled, has the plating 5 of the handle or grip portion, in direct grip proximity to the bowl 1. Accordingly, the metal wall of the plating 5 may conduct heat from the grasping hand of the operator to the metal bowl 1. Thereby the tendency of congealed material to adhere to the bowl is minimized. This mode of release or avoidance for sticking of the product, may be further aided by heat transference from slushing liquid 12 in the tool. In practice, it is desirable to have such liquid but a partial filling. Accordingly, the normal orienting of the tool so causes the liquid to move that, in use, the experience has been to free the tool from tendency of ice cream or other congealed material to adhere even in maintained service operations.

The bowl

Tubular handle 17 hereunder may be formed by this pattern 3 of conducting material surface for the handle exterior (Fig. 1) as more uniform for plating than if the plating be upon the interior of conducting material surface pattern 44 (Fig. 14). Electrodeposit makes possible integral continuity in a light weight tool which is efficient. Bowl 18 (Figs. 5, 6) is of general spheric form and has liquid holding chamber or jacket 19 in which liquid may slush from the handle 17.

A severing rim portion 20 for the bowl 18 is directly opposite from the handle 17. Conveniently, there may be a severing rim 21 (Fig. 7) at an angle as to the general direction of the handle.

In lieu of the approximately spheric bowls 1, 18, a departure form bowl 22 (Fig. 8) may be adopted with an elongated portion 23 with a ridge or intermediate rib 24. A duct portion 25 from the bowl may be in communication with the tubular handle chamber. In further contour, this bowl has a rim 26, with concave sections 27, 28, as a sort of divided bowl. A supplemental form (Fig. 11) shows an intermediate rib or ridge 29 of less curvature than the rib 24, and the bowl with an approximately straight terminus 30. When a detachable handle form is adopted (Fig. 12) grip 31 may have a thread assembly or connection 32 with such in line from a rib or ridge 33 of twin bowl sections 34.

The liquid

In the functioning hereunder, the charge in the hollow handle of the liquid 12 may be of a liquid selected according to the character of the use sought. In the event there be an occasion for a use below a freezing temperature of water, then instead of adopting water for the liquid, a relatively non-freezing liquid may be sought, say among refrigerants. Even an oil of petroleum product character, or salt solution may be used. Advantage arises in having the liquid freely swish against the walls, thereby serving to promote heat transference away from the grip to the bowl.

The instance of the bowl lining 1, may have its surface or face planished or prefinished in the flat before forming into the concavity for the bowl lining. Importance attaches to the finish for the tool and such, even to coating the bowl lining, may be by an outer or over-all plating 35 (Fig. 1). In the instance there be this supplemental plating, say as cadmium or chromium, such hard finish may be upon a wall which might otherwise be less rigid to stand-up in use, such as copper.

Formation inwardly

The method of electrodeposit may be effected from an electrolytic bath 4 (Fig. 13), with an outer permanent electrode of mold sections 36, 36', having a snug parting line 37 therebetween. Hinge pins 38 on the section 36 assemble the die or two-part mold electrodes 36, 36' for hooks 39, to swing into engagement with pins 40 on the section 36'. There is thus a positive assembly of the mold electrode into a unit for suspension by hooks 41 from supporting rods 42. Dowel pins 43 coacting between the sections 36, 36', determine a regularity for a contour 44 of the die interior.

A complementary electrode 45 (Fig. 14) may be located by supporting hook 46 to hang from carrying rod 47 (Fig. 13). The free end of this electrode 45 opposes the enlarged hollow end of the tool.

Electro-deposit progress hereunder in practice develops a grip or handle tubular portion 48 (Fig. 14), which, at its outer terminus has a slight offset 49. Remote therefrom, but directly from the tubular grip 48, is a bulbous terminus 50. Upon removing the electro-deposit article from the mold or die electrode, say by removing from the electrolyte and opening the mold, the article may be exposed to an annealing action, say by local heat blasts 51 (Fig. 15). This heat treatment may be confined to a rather narrow line or strip 52 as the region for the rim of the bowl-to-be. Upon occasion, depending upon the thickness of the deposit and its resistance to re-formation, there may be a coupling 53 for a pressure line 54, thereby to supply a medium within the hollow article during the interval a head 55 is directed into the bowl-to-be, with the article opposite wall firmly held in a die 56. Dotted lines 57 show the progress of the head 55 in collapsing the bulb 50 to form a bowl lining or interior wall 58. A strike-off tool 59 (Fig. 18) may determine appropriate sharpening for a severing edge or terminus 60. A heat conducting liquid 61, may be charged as a refrigerant solution in the completed hollow tool. With such a partial charge to permit ready slushing about, a cap 62 may have a solder assembly 63, with an electro-plating dip 64 so to bond as fully to conceal assembly. The handle grip may carry an identification 65 from the electrode.

This application is a continuation-in-part of Ser. No. 344,904 filed July 11, 1940, by this applicant, and co-pending herewith.

What is claimed and it is desired to secure by United States Letters Patent is:

1. The method of producing a dispensing tool having a hollow handle and a bowl portion, said method comprising the steps of providing an electric conductor which in cross section has an endless curved surface pattern of decreasing diameter from a hand-width length in hand grasped dimension and a bowl rim section open laterally from the line of the handle axis which is extended by enlarging the pattern from the decreased diameter portion to merge into the rim for such bowl-end-of-the-handle to be closed by the bowl in completing peripheral surface continuity, the pattern being an electroplating-receiving terminal continuous surface from the handle portion to and including the rim portion, submerging such pattern in an electrolytic bath provided with a suitable anode, and electroplating thereon a handle and a rim portion integral with each other and of such thickness as to be self-sustaining, separating the electroform from the pattern, and finishing the rim as bounds for a bowl.

2. The method of producing a dispensing tool having a hollow handle and a bowl portion, said method comprising the steps of providing an electric conductor which in cross section has an endless curved surface pattern of decreasing diameter from a hand-width length in hand grasped dimension and a bowl with a rim section open laterally from the line of the handle axis which is extended by enlarging the pattern from the decreased diameter portion to merge into the rim and bowl for such bowl-end-of-the-handle to be closed by the bowl in completing peripheral surface continuity, the pattern being an electroplating-receiving terminal continuous surface from the handle portion to and including the rim portion and bowl, submerging such pattern in an electrolytic bath provided with a suitable anode, and electroplating thereon a handle, a rim portion and bowl integral with each other and of such thickness as to be self-sustaining, separating the electroform from the pattern, pressing the bowl portion of said electroform to give it sufficient concave form, and finishing the rim as bounds for the bowl.

3. The method of producing a dispensing tool having a hollow handle and between a ferrule and a bowl inner wall portion, said method comprising the steps of providing an electric conductor between the ferrule and the bowl inner wall portion which in cross section has an endless curved surface pattern forming a core of decreasing diameter from a hand-width length in said hand grasped dimension and a bowl rim section open laterally from the line of the handle axis which is extended by enlarging the pattern from the decreased diameter portion to merge into the rim for such bowl-end-of-the-handle to be closed by the bowl in completing peripheral surface continuity, the pattern being an electroplating-receiving terminal continuous surface from the handle portion to and including the rim portion, submerging such pattern in an electrolytic bath provided with a suitable anode, and electroplating thereon a handle and a rim portion integral with each other and of such thickness as to be self-sustaining, separating the electroform from the pattern, and finishing the rim as bounds for the bowl.

ESTEL O. WHEATON.